(12) United States Patent
Sammauro (10) Patent No.: US 9,327,915 B1
(45) Date of Patent: May 3, 2016

(54) LOW PROFILE TRANSFER CONVEYOR FOR BRIDGING GAPS IN MULTI SEGMENT CONVEYORS

(71) Applicant: Eaglestone Inc, St. Charles, IL (US)

(72) Inventor: Carmen Sammauro, Lombard, IL (US)

(73) Assignee: EAGLESTONE INC., West Chicago, IL (US)

( * ) Notice: Subject to any disclaimer, the term of this patent is extended or adjusted under 35 U.S.C. 154(b) by 0 days.

(21) Appl. No.: 14/797,138

(22) Filed: Jul. 12, 2015

(51) Int. Cl.
*B65G 47/66* (2006.01)
*B65G 23/44* (2006.01)
*B65G 15/08* (2006.01)
*B65G 15/62* (2006.01)

(52) U.S. Cl.
CPC ............... *B65G 47/66* (2013.01); *B65G 15/08* (2013.01); *B65G 23/44* (2013.01); *B65G 15/62* (2013.01)

(58) Field of Classification Search
CPC ........ B65G 15/08; B65G 15/62; B65G 47/66; B65G 23/44
USPC .......................................................... 198/600
See application file for complete search history.

(56) References Cited

U.S. PATENT DOCUMENTS

| | | | | |
|---|---|---|---|---|
| 4,142,625 A * | 3/1979 | Bourgeois | ............ | B65G 37/00 198/570 |
| 5,605,222 A * | 2/1997 | Huberty | ................. | B65G 15/62 198/600 |
| 5,692,597 A * | 12/1997 | Ferguson | ............... | B65G 15/00 198/841 |
| 5,915,527 A * | 6/1999 | Nakamura | ............ | B65G 15/62 198/823 |
| 5,967,296 A * | 10/1999 | Dolan | .................... | B65G 17/08 198/853 |
| 6,367,619 B1 * | 4/2002 | Cemke, Jr. | ............ | B65G 47/66 198/837 |
| 7,308,979 B1 * | 12/2007 | Layne | .................... | B65G 17/08 198/600 |
| 7,762,389 B2 * | 7/2010 | Lee | ........................ | B65G 15/60 198/835 |
| 2007/0017786 A1 * | 1/2007 | Hosch | .................... | B65G 15/62 198/841 |
| 2008/0296129 A1 * | 12/2008 | Yagi | ...................... | B65G 23/22 198/779 |
| 2010/0275790 A1 * | 11/2010 | Takai | ..................... | B65G 15/08 99/443 C |

* cited by examiner

*Primary Examiner* — Mark A Deuble
(74) *Attorney, Agent, or Firm* — Kajane McManus; John Tolomei (57) ABSTRACT

The low profile transfer conveyor bridges gaps between terminal ends of contiguous multi segment conveyors and provides a driven belt bridge with a length that approximately bridges the space between conveyor belt segments of the multi segment conveyors and has a low profile which minimizes any unsupported distance across which articles must cross between conveyor belt segments by providing a small continuous section of driven conveyor belt traversing a surface bounded on two sides by small radius edges so the horizontal length of the transfer conveyor extends almost to the horizontal surface of the belt segments on opposite sides of the gap that it bridges. At its ends, the transfer conveyor is stretched between a pair of pulleys having a larger diameter than the small diameter edges of the transfer conveyor which are adjacent the beginning of the curvilinear portion of the conveyor belt segment as defined by its terminal roller.

20 Claims, 5 Drawing Sheets

LOW PROFILE TRANSFER CONVEYOR FOR BRIDGING GAPS IN MULTI SEGMENT CONVEYORS

BACKGROUND OF THE INVENTION

Conveyor systems are routinely used to move articles in industrial settings, such as in package handling or in food preparation. These conveyor systems typically consist of a long linear length of belt tightened between two transverse rollers (with transverse or laterally in all cases defined as the perpendicular to the movement of the belt associated therewith) at least one of which drives the belt that moves the articles placed thereon along the path of the belt.

The conveyor systems typically consist of multiple segments of drive belts that carry articles. As the transported articles pass from one conveyor segment to another they must cross a gap between the belts created by the rollers between which the belt of the conveyor belt segment is stretched. The size of the gap between the belts depends on the size of the rollers at the terminal ends of the belt. The larger the roller diameter at terminal ends of contiguous belt segments, the greater the discontinuity between the belt segments. The geometry of the rollers and the necessity to space different belt segments apart can create the opportunity for a significant vertical drop of articles carried by a belt segment as the articles cross the gap to the next belt segment. When an article is relatively small compared to size of the gap it must cross, the article can tip or, worse yet, tumble, as it passes from one belt segment to the next.

Various forms of bridging assemblies are used to prevent the tipping and tumbling of articles as they pass from one conveyor segment to the next. One type of gap filler comprises solid plate sections that bridge the gap to minimize the tumbling of articles as they pass from one conveyor segment to the next. A disadvantage of this type of filler is that articles tend to drag across the top surface or need to be pushed by an adjacent article before moving from one conveyor segment to the next. The dragging of articles over such a plate section poses significant problems where the conveyor segment is required to transport articles at a uniform spacing.

Another type of bridging assembly consists of a much smaller roller or roller belt assembly juxtaposed between the two belt segments. The smaller roller will, to some extent, reduce the potential for downward dropping or tumbling of the article as it passes from one belt to the next but it still does not eliminate the possibility of articles tumbling or tipping.

SUMMARY OF THE INVENTION

According to the invention there is provided transfer conveyor which bridges gaps between terminal ends of contiguous multi segment, large conveyors and provides a driven belt bridge having a length for conveying articles that bridges approximately the full space between conveyor belt segments wherein the driven belt or transfer belt has a low profile adjacent to the ends of the large conveyor thereby minimizing any gap between the large conveyors. In this manner the transfer conveyor conveys articles between the conveyor segments and prevents their tipping or tumbling. The transfer conveyor terminates at its distal end (defined as its transverse edge that is parallel to the width of the belts of the large conveyors) with a very thin edge that because of its minimal thickness can be located adjacent to the conveying surface of the large conveyor. The adjacent location of the thin edge refers to a location as near as possible to the conveying surface of the large conveyor. The transfer belt has a width greater than its conveying width, i.e. the transverse portion of the transfer belt that receives and delivers conveyed articles and the driving force that moves the belt is imparted to the extended portion of the transfer belt. Imparting the driving force for the linear motion of the transfer belt to its extended width portion permits the use of the thin edge at the distal ends of the transfer conveyor in combination with the driven belt and thereby achieves the necessary minimization of any gap between belts small enough to prevent any the tipping or tumbling of conveyed articles as pass onto and/or off of a large conveyor.

The transfer conveyor may take many forms and serve a variety of applications. The transfer conveyor can provide a flat or arcuate surface that receives articles from and/or delivers articles to the belt of a large conveyor. An arcuate surface may be convex or concave. In its usual form and application the transfer conveyor fills the gap between large, highly rounded belt ends of adjoining sections of large conveyors created by the large radius rollers at their terminal ends to provide moving a flat that receives articles from an upstream conveyor and delivers them to a downstream conveyor. In other applications the articles may be place directly upon the transfer conveyor and then delivered to a transfer conveyor or may receive articles from a transfer conveyor and deliver the articles directly to a processing or packaging step. In certain arrangements the conveying surface of the transfer belt may have a greater of lesser width than the conveying surface of a large conveyor from which it receives articles or to which it delivers articles.

The thin edge at a distal end of the transfer conveyor will have a thickness that is much less than the radius of the adjacent end roller of the large conveyor. The thickness of the thin edge will be less than 25% of the radius of the end roller, preferably less than 10% of the radius of the end roller and more preferably less than 5% of the radius of the end roller. In most cases the thin edge have as near a knife-like edge as possible while still permitting the continuous movement of the transfer belt thereover. In most cases the thin edge will be in the form of a nose made of that defines a small radius and is defined by a low friction material. This radius will typically range in size from $1/16$ to $1/2$ and preferably $1/16$ to $1/4$ inch. The nose may comprise a separate structural element of the transfer conveyor. In some cases small transverse rollers or bearings may be incorporated into the nose to reduce friction as the transfer belt moves over the thin edge or nose.

A variety of suitable drive assemblies can impart the necessary transverse, continuous, linear motion to the transfer belt. However, suitable methods cannot use any large rollers at the a thin edge of the transfer conveyor. One method of imparting linear motion to the transfer belt uses a transfer belt having a greater width than the width of the conveying surface provided by the transfer belt so at least one end of the transfer belt extends transversely beyond the portion of the belt surface that receives the conveyed articles and beyond the width of the thin edge over which it passes. This arrangement provides at least one extended end of the transfer conveyor to transition in shape to provide a relatively large interior cross section that can receive a pair of pulleys having a larger diameter than the thin edges of the transfer conveyor. At least one of the larger diameter pulleys engage the transfer belt to drive its linear motion. Such pulleys may be provided at one extended of the transfer belt or the transfer belt may have an extended section of its width on both sides to receive pulleys for guiding or driving the transfer belt.

Thus in one form the driven, transfer belt of the transport conveyor can use as the transfer belt a short continuous belt segment having a uniform length stretched over the lateral distance between the thin edges and the transfer belt can extend in the direction of its width past the normal conveying width of the transfer belt to provide an extended section of the transfer belt that contacts a pair of pulleys to provide translation of the belt across the horizontal surface in the small radius end edges. In addition to the previously described arrangement, another form of the transfer belt may have a greater continuous length at one or both of its outer edges to accommodate larger pulleys for driving the belt, i.e. the transfer belt has a longer path of travel at its ends than in its middle. In either case, extending the transfer belt past the normal width of the conveyor belt segments, provides a section of belt for imparting motion to it at a location away from the curvilinear portion of the large conveyor belt segment. Since the extended portion of the short belt extends past the width of the conveyor segment, the pulleys about which it is suspended may have a larger diameter. One of these pulleys will serve as a drive roller to provide the necessary driving force to the short conveyor belt of the driven low profile belt transfer conveyor. By locating the pulleys where they can have a larger diameter than the short radius edges, the pulley/drive roller can provide the necessary contact and tension to maintain steady continuous movement of the belt on the transport conveyor such that it can match the belt speed of the conveyor segments and can move in either direction, as dictated by the conveyor belts it bridges.

The pulleys or other device that controls the transfer belt speed of the transfer conveyor may be timed in any manner that will keep the transfer belt moving at a desired speed with respect to the belt speeds of the large conveyors between which it is located. The speed of the transfer conveyor belt will typically match the speed of the belt of the large conveyors. In some special cases it may be desired to use the transfer conveyor to provide a speed transition where one of the belts of the large conveyors moves at different speeds and the belt of the transfer conveyor moves at an intermediate speed between the different speeds of the belts of the large conveyor.

Any type of drive input may be used to turn pulleys that drive the transfer belt in unison at a desired speed. A simple method is to directly link an end pulley of a large conveyor with a drive pulley of the transfer conveyor with a gear or drive belt. Sizing of the gears or pulleys for the drive belt can time the relative rotation of the pulley as desired to effect the desired linear motion of the belt for the transfer conveyor. Another alternative is to provide an independent drive for the transfer belt pulley that has its own speed control for adjusting the linear motion of the transfer conveyor belt.

Accordingly in one form the invention comprises a transfer conveyor for bridging the gap between the terminal ends of contiguous multi segment, large conveyors that loop a conveyor belt segment over at least one end roller to transport articles on the conveyors. The transfer conveyor comprises two belt tensioners spaced apart from each other in a parallel arrangement by a distance comprising a transport distance and located on opposite sides of the transfer conveyor with each tensioner having an outermost edge over its transverse length and the outermost edge having an edge thickness that is less than the radius of the end roller. A transfer belt is suspended between the belt tensioners with an upwardly facing belt surface that provides a conveying surface. The transfer belt has a width greater than the transverse length of the belt tensioners to provide a drive section of the transfer belt located to at least one side of the belt tensioners. The transfer conveyor also comprises a pair of pulleys having a diameter greater than the edge thickness and less than the diameter of the end roller that are in contact with the inner surface of the transfer belt at the drive section to impart tension thereon and at least one of the pulleys comprises a drive pulley capable of moving the transfer belt continually over the outermost edges to impart linear motion to the transfer belt and convey articles between the multi segment large conveyors.

DESCRIPTION OF THE PREFERRED EMBODIMENT

The low profile transfer conveyor for bridging multi segment conveyors of the present invention comprises a small low profile conveyor which fills the gap between contiguous terminal ends of conveyor belt segments and provides a driven belt bridge with a length that approximately bridges the space between belt segments of large conveyors and has a low profile which minimizes any unsupported distance across which articles must cross between conveyor belt segments. The low profile transfer conveyor disclosed herein can transport conveyed articles across the gap between adjacent conveyor belt segments by providing a small continuous section of transfer conveyor having a belt which is driven across a bridging surface bounded on its two sides by small radius edges. In this manner the length of the transfer conveyor can extend almost to the surface of each belt segment on opposite sides of the gap that it bridges. At its ends, the transfer belt of the transfer conveyor is stretched between a pair of pulleys having a larger diameter than the small diameter edges of the transfer conveyor which are located adjacent to the beginning of the curvilinear portion of the conveyor belt segment as defined by its terminal roller.

The belt surface of the transfer conveyor of this invention may have a horizontal or inclined orientation and may provide a flat or rounded surface. In most cases the belt surface will have a horizontal orientation and provide a flat surface. For convenience the rest of this preferred embodiment describes the transfer conveyor as having a flat surface with a horizontal orientation, however the invention may be practiced with a transfer conveyor oriented at any suitable angle to retain conveyed articles thereon with a flat or surface profile that suits the particular application.

Figure 5:
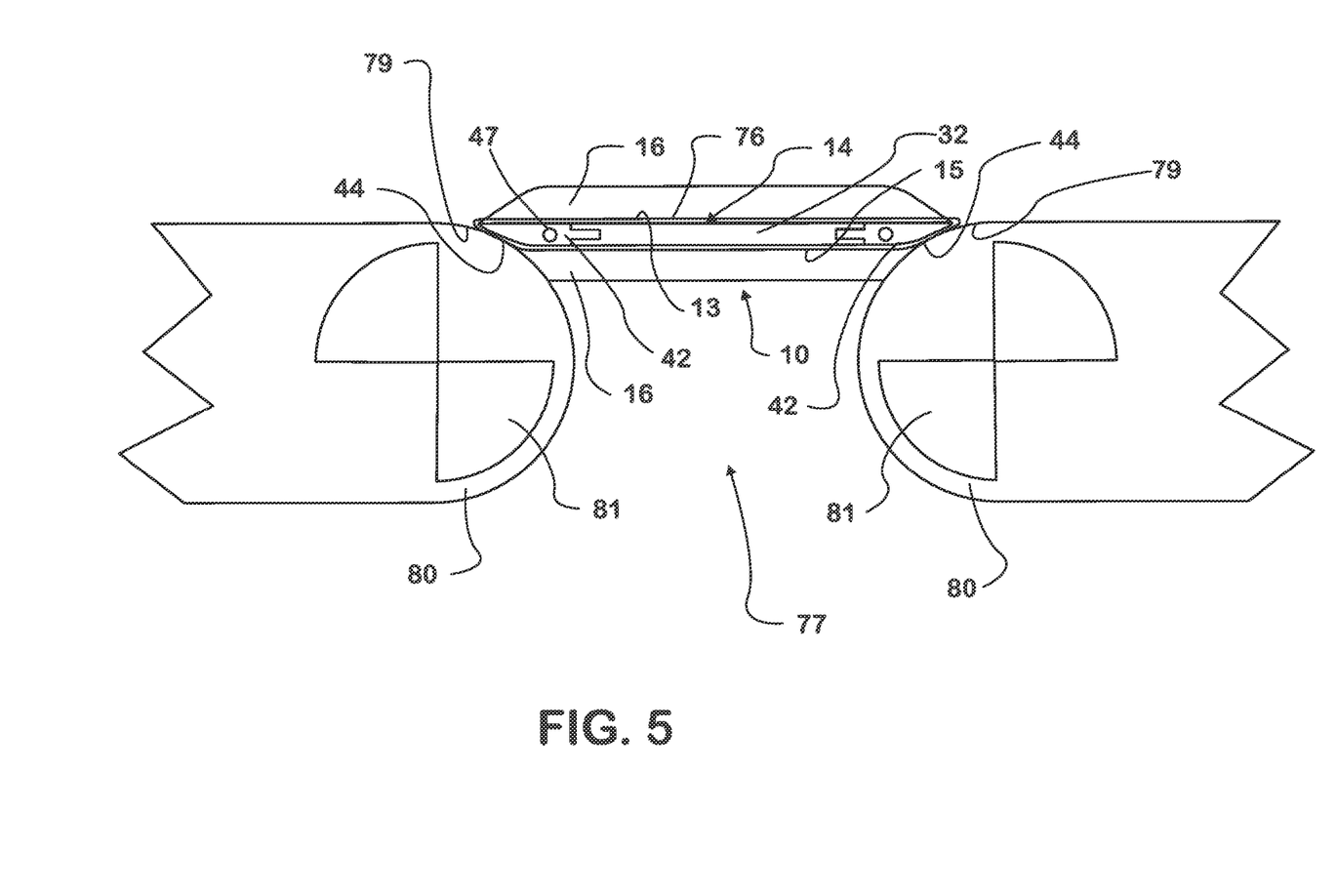
FIG. 5 provides a cross sectional view through a middle section of the low profile transfer conveyor for bridging multi segment conveyors of the present invention in its environment of use.

Turning now to the Figures, it will be seen from FIGS. 1-3 that the transfer conveyor of the present invention, hereinafter referred to as transfer conveyor 10, comprises a first assembly 12 which may be defined as a low profile belt assembly 12. A belt 14 of the belt assembly 12 is preferably made of light weight, food grade belting and will be seen to be continuous and to have the upper surface 13 and lower surface 15 configured into a relatively flat arrangement over a central base portion 32 (FIG. 5). The spacing between the upper and lower surfaces of the belt increase into an oval configuration by outwardly flaring the central portion of the transfer belt at its outboard ends 16. Within each of these ends 16 is bonded a timing belt 18 including at least one guide section 20 along an interior surface 22 thereof, which at least one guide section 20 may be of a V-guide configuration, though this should not be construed as limiting. The at least one guide section 20 is needed for proper alignment of the timing belt 18 relative to a second functional assembly 30 of the conveyor 10 which may be defined as the mechanical body or belt carrying assembly 30.

Figure 1:
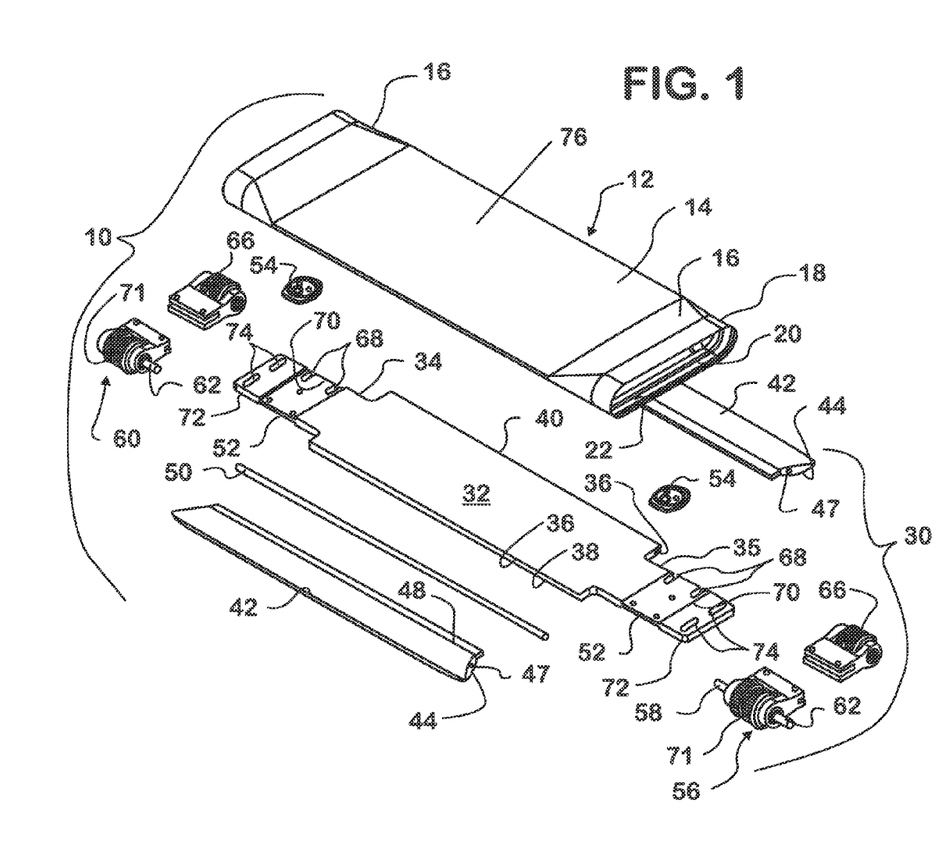
FIG. 1 provides an exploded perspective view of the low profile transfer conveyor for bridging multi segment conveyors of the present invention.
Figure 2:
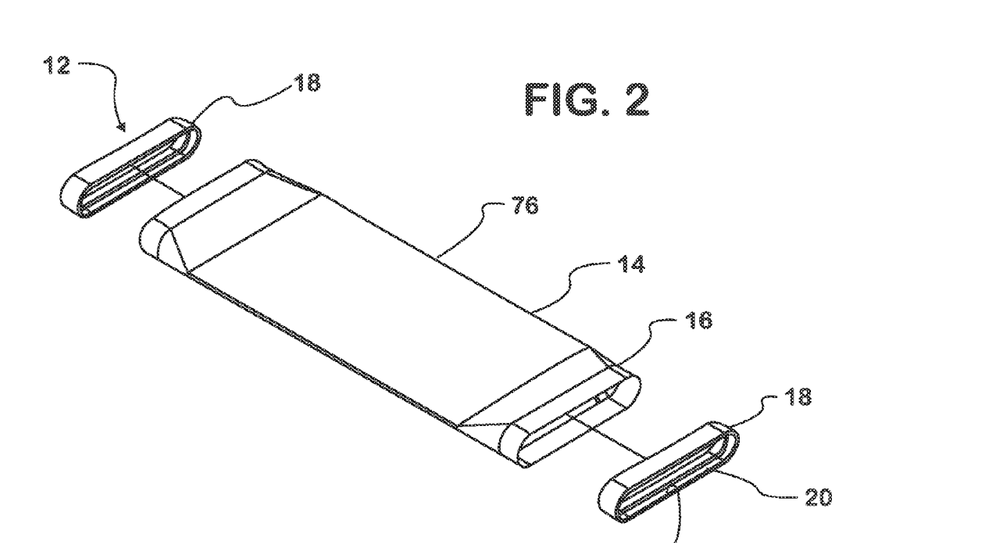
FIG. 2 provides an exploded perspective view of the low profile belt assembly of the low profile transfer conveyor for bridging multi segment conveyors of the present invention showing timing belts with guides which are bonded onto the interior of each flared end of the continuous belt of the belt assembly.
Figure 3:
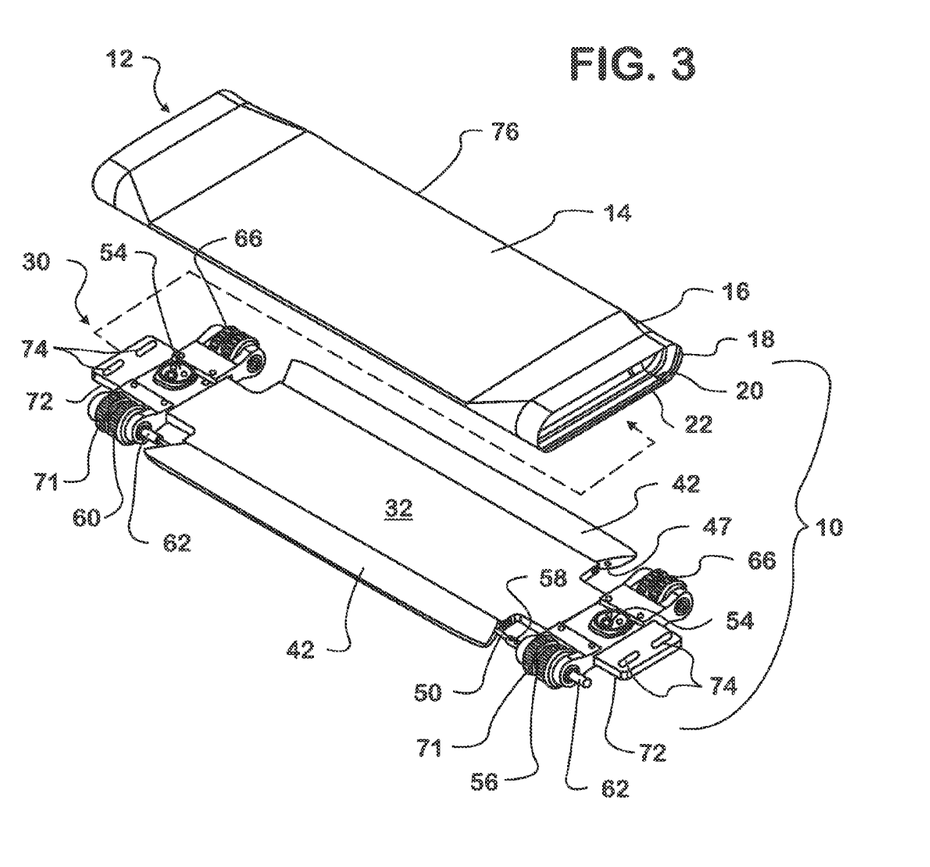
FIG. 3 provides an exploded perspective view of the low profile transfer conveyor for bridging multi segment conveyors of the present invention and shows the mechanical body or belt carrying assembly of the invention in its assembled state.

FIGS. 1 and 3 provide exploded perspective views of the transfer conveyor 10 including the belt assembly 12 as defined above and the mechanical body or belt carrying assembly 30. It will be understood that the belt carrying assembly 30 is assembled and located within the confines of the continuous belt 14 of the belt assembly 12. The belt carrying assembly 30 includes a base portion 32 which is of a width in a direction transfer to the movement of the belt that is greater of the belt assembly 12 and carries thereon the functional or mechanical structures of the transfer conveyor 10. In this respect, it will be seen that the base portion 32 includes two narrow end flanges 34 and 35 and further includes two elongate grooves 36, one within each elongate side edge 38 of a wider central portion 40 of the base portion 32.

The elongate grooves 36 along each side edge 38 of a wider central portion 40 each engage, in a tongue in groove manner, a static nose piece 42, preferably made of a thermoplastic with a laterally outwardly narrowing lower outer peripheral edge 44 which acts as a belt guide along the length of the belt 14 which travels thereacross as will be further described herein below. Each nose piece 42 may further includes a cylindrical bore 47 extending lengthwise through the nose piece along a laterally extended inner edge 48 thereof through at least one of which extends a drive shaft 50, the cylindrical bore 47 acting as a bearing surface for the at least one drive shaft 50, as well as allowing for lateral dual drives, if desired.

The narrow end flanges 34 and 35 are each configured in sections, a first section 52 of each of which provides a belt tensioner for moving on or both of the nose pieces outwardly. As shown in the figures the belt tensioner may take the form of a low profile cam positioned centrally thereupon a low profile cam action belt tensioner 54 which is manually settable to maintain desired tension on the belt 14. To one side of one tensioner 54 on end flange 35 is fixedly mounted a dual drive pulley 56 which aids in belt 14 tracking and substantially eliminates twisting of belt 14. An inner end nub 58 of drive pulley 56 is fixedly engaged to a corresponding end of the drive shaft 50 extending through the cylindrical bore 47 in a nose piece 52. Drive pulley 56 is also provided with a drive shaft nub 62 which can be powered by any suitable means, such as direct belt drive, slave drive, etc. At the opposite end of the drive shaft 50, fixedly engaged to section 52 on end flange 34 is a driven pulley 60 which is driven by the drive shaft 50 to which it is engaged at an inner end nub 62 thereof.

Also engaged to section 52 of both end flanges 34 and 35, on an opposite side of the cam tensioner 54, across from the pulleys 56 and 60 are mounted free spinning pulleys 66 which are mounted slidably within parallel tracks 68 for same inwardly of side edges 70 of the sections 52. They are slidably mounted so that the cam tensioner 54 can be set manually to act upon them as necessary to maintain appropriate tension on the belt 14 of belt assembly 12. Of course, they are mounted in alignment with the respective cooperating pulleys 56 and 60 as well. Thus, it will be understood that when the transfer conveyor 10 is fully assembled, the V-configured guide 20 of the timing belt 18 cooperates with a corresponding groove 71 on each of the pulleys 56, 60 and 66, maintaining proper tracking of the belt 14 and substantially eliminate twisting thereof. Each of the end flanges 34, 35 further includes a terminal portion 72 having a pair of laterally linearly aligned slots 74 therein which are provided for engaging the transfer conveyor 10 to support structure thereunder, as described in connection with FIGS. 6 and 7.

Figure 4:
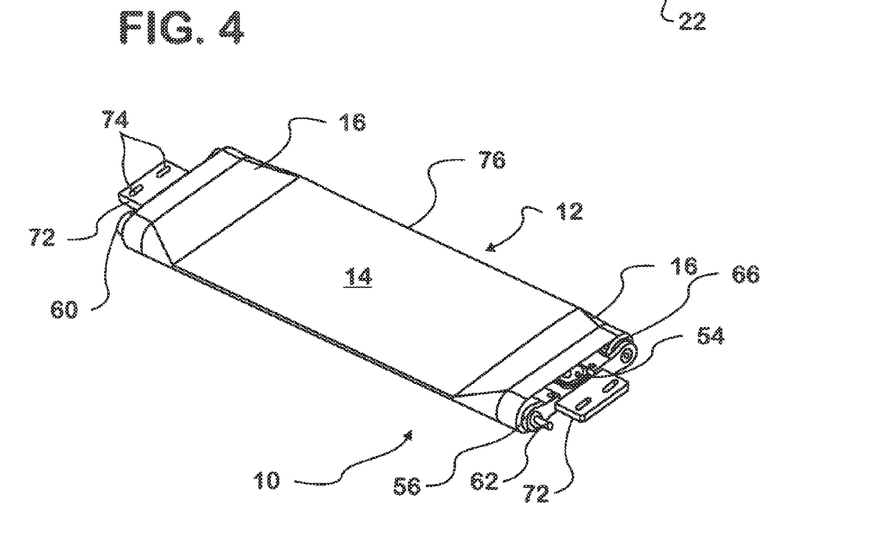
FIG. 4 provides a perspective view of the low profile transfer conveyor for bridging multi segment conveyors of the present invention in a completely assembled state with the mechanical body or belt carrying assembly seated within an interior cavity of the continuous belt assembly of the conveyor.

FIG. 4 illustrates the low profile bridging transfer conveyor 10 constructed and in its functional state, with the mechanical body or belt carrying assembly 30 appropriately seated within the continuous belt 14 of the belt assembly 12. In this configuration it is ready for use in bridging a gap 77 between contiguous ends 79 of multi sectional conveyor belts 80, as best illustrated in FIG. 5. It will be understood that the ends 79 are curvilinear, as defined by large diameter end rollers 81.

FIG. 5 illustrates a simplified lateral cross sectional view of the transfer conveyor 10 in its working environment, showing a low profile center section 76 thereof between the two flared outboard ends 16 being maintained substantially at the same level as the upper surface of the conveyor belts 80, in this case the same horizontal level, as the contiguous ends 79 of multi sectional conveyor belts 80 traveling around the large diameter end rollers 81. It will also be best seen here that the outwardly undercut lateral edge areas 44 of the side flanges 42 of the mechanical body 30 create a small radius for the low profile center section 76 along its lateral edges to allow for a smooth transition of product thereacross and onto the contiguous end portion 79 of next conveyor belt 80. It will also be understood that no structures such as drive rollers, sprockets, etc. are positioned beneath the transfer conveyor 10 in its preferred embodiment. It will also be understood by those skilled in the art that the low profile conveyor 10 is capable of bidirectional travel.

Figures 6, 7:
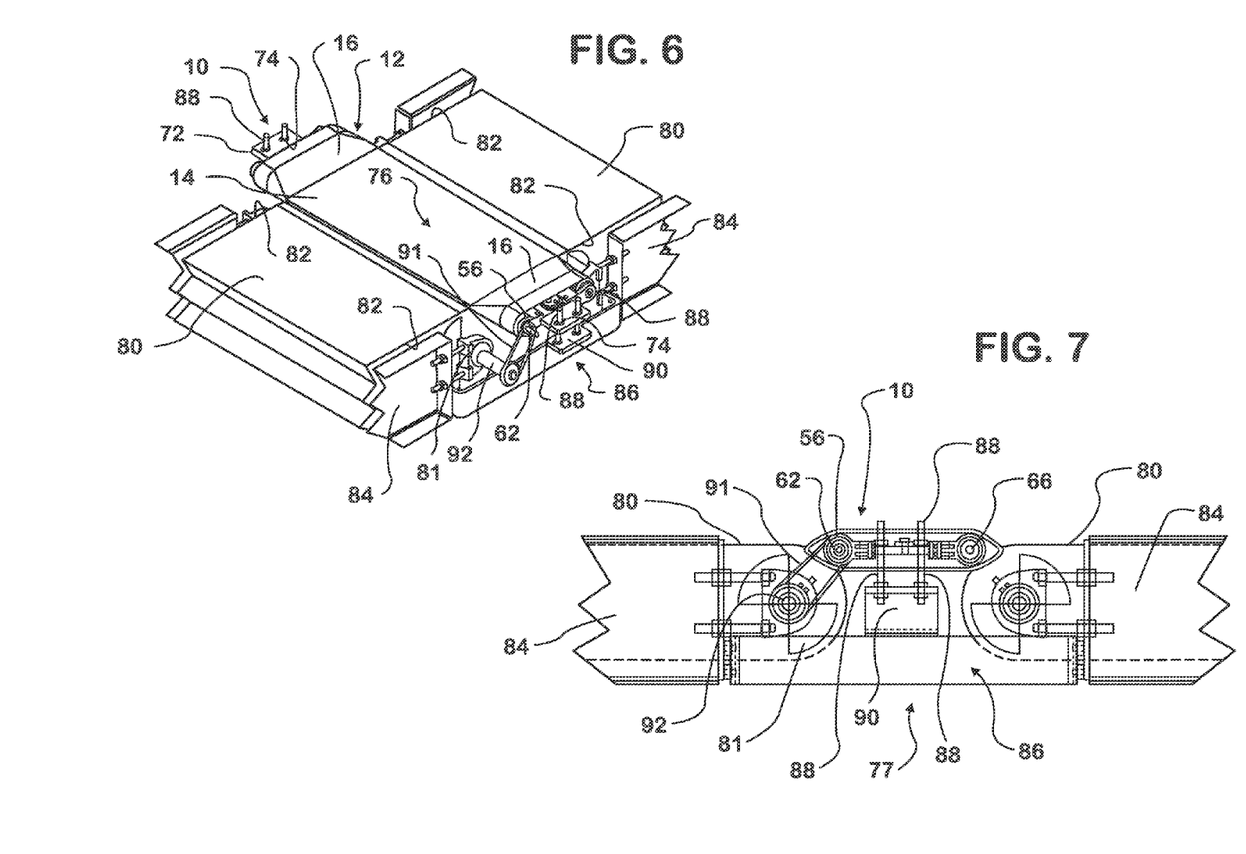
FIG. 6 provides a perspective view of the low profile transfer conveyor in its environment of use.
FIG. 7 provides an end view from the drive end of the low profile transfer conveyor in its environment of use.

Turning now to FIG. 6, it will be seen that the low profile center section 76 of transfer conveyor 10 extends substantially along an entire width of contiguous belts 80 between which it is to transfer items from one to another over gap 77 therebetween. It will further be seen that the flared portion of outboard ends 16 of the transfer conveyor 10 extend beyond side edges 82 of the belts 80, acting somewhat like stop member shoulders 16 to aid in maintaining product in travel therealong. Further, it will be understood that in a preferred embodiment, the transfer conveyor 10 may be fixed in position relative to the belts 80 which it is bridging. In this respect, frame sections 84 of the belts 80 may be engaged to a support member 86 of suitable configuration to which the transfer conveyor 10 may be engaged, preferably by threaded rods, bolts 88 or the like which allow for adjustment of height relative to the level of the belts 80. As there are many suitable embodiments for engagement of the transfer conveyor 10 between belts 80, the embodiment illustrated should be considered exemplary and not limiting to the teachings herein. As an example, the threaded, adjustable bolts 88 could be engageable to a support block 90 or the like for the transfer conveyor 10 by engaging through the laterally linearly aligned slots 74 in the terminal portions 72 of the end flanges 34, 35.

As further illustrated, the end nub 62 of the drive pulley 56 may be engaged by any suitable means such as belt or chain 91 to a hub 92 of an end roller 81 of one of the contiguous belts 80, so as to be driven thereby. This also is merely exemplary in nature as the belt can be driven by other means, as understood by those skilled in the art, as well.

As product passes from one to another of the belts 80 through use of the transfer conveyor 10, they are animated in travel thereacross, avoiding backups and the like and substantially maintaining all the product isolated to travel along the entire width of the belts 80 by the rising shoulders 16 created by the flaring at the outboard ends 16 of the transfer conveyor 10.

As described above, the transfer conveyor 10 provides a number of advantages, some of which have been described above and others of which are inherent in the invention. Also, modifications may be proposed without departing from the teachings herein. Accordingly the scope of the invention is only to be limited as necessitated by the accompanying claims.

The invention claimed is:

1. A transfer conveyor for bridging the gap between the terminal ends of contiguous multi segment, large conveyors that loop a conveyor belt segment over at least one end roller to transport articles on said conveyors, said transfer conveyor comprising: two belt tensioners spaced apart from each other in a parallel arrangement by a distance comprising a transport distance and located on opposite sides of the transfer conveyor with each tensioner having an outermost edge over its transverse length and the outermost edge having an edge thickness that is less than the radius of the end roller; a transfer belt suspended between the belt tensioners with an upwardly facing belt surface that provides a conveying surface, said transfer belt having a width greater than the transverse length of the belt tensioners to provide a drive section of the transfer belt located to at least one side of the belt tensioners; a pair of pulleys having a diameter greater than the edge thickness and less than the diameter of the end roller that are in contact with the interior of the transfer belt at the drive section to impart tension thereon and at least one of the pulleys comprising a drive pulley capable of moving the transfer belt continually over the outermost edges to impart linear motion to the transfer belt and convey articles between the multi segment large conveyors.

2. The transfer conveyor of claim 1 wherein the transfer belt has a drive section located on both sides of the belt tensioners.

3. The transfer conveyor of claim 1 wherein the transport surface has width equal to the width of the large conveyors.

4. The transfer conveyor of claim 1 wherein at least a portion of the pulleys extend above the transport surface to provide the transfer belt to keep a portion of the drive section above the transport surface.

5. The transfer conveyor of claim 1 wherein the drive pulley moves the transfer belt at the same linear velocity as at least one of the conveyor belts of the multi segment large conveyors.

6. The transfer conveyor of claim 1 wherein the continuous length of the transfer belt is the same across the entire width of the belt.

7. The transfer conveyor of claim 1 wherein the outermost edge comprises a low friction material in the form of a small radius nose and the radius of the nose is less than 25% of the radius of the end roller.

8. A low profile transfer conveyor for bridging a gap between contiguous ends of conveyor belts of a multi segment conveyor system, the transfer conveyor comprising a belt assembly and a mechanical assembly received within the belt assembly for use in producing motion of the belt of the belt assembly, the belt assembly comprising a continuous belt having a low profile central section and outwardly flaring ends with the low profile central section extending along at least a portion of the width of the conveyor belts it is to bridge, and the mechanical belt carrying assembly comprising at least a base portion for supporting the belt assembly and aligned cooperating pairs of tensioned end pulleys about which the transfer conveyor belt is guided, with at least one of the pulleys being a drive pulley for driving the belt assembly about the mechanical belt carrying assembly.

9. The low profile transfer conveyor of claim 8 wherein the outwardly flaring ends of the belt assembly accommodate therewithin the pulleys of the mechanical belt carrying assembly and are each provided with a timing belt having at least one guide section and being bonded to an interior surface of the flaring ends for cooperating with a corresponding positioning groove in each of the pulleys to keep the belt tracking without twisting.

10. The low profile transfer conveyor of claim 8 wherein the outwardly flaring ends of the belt assembly act as stop member shoulders along end edges of the transfer conveyor for keeping product in line with the low profile central section of the belt for transport from one conveyor belt segment to another.

11. The low profile transfer conveyor of claim 8 wherein the mechanical belt carrying assembly carries along each side edge thereof a thermoplastic static nose piece with a laterally outwardly narrowing lower outer peripheral edge which acts as a belt guide along a length of the transfer conveyor belt which travels thereacross.

12. The low profile transfer conveyor of claim 8 wherein the mechanical belt carrying assembly is provided with static nose pieces and each static nose piece is provided with a bore extending along a length thereof, at least one of the nose pieces supporting a drive shaft extending through the bore between a drive pulley and a driven pulley of the aligned pulley pairs.

13. The low profile transfer conveyor of claim 8 wherein each pair of pulleys aligned across from one another along a width of the mechanical belt carrying assembly is tensioned by a tensioner therebetween which is manually adjustable to provide a desired tensioning on the belt assembly.

14. The low profile transfer conveyor of claim 8 wherein one of each pair of pulleys aligned across from one another along a width of the mechanical belt carrying assembly is fixed in position and the other is laterally slidable.

15. The low profile transfer conveyor of claim 8 wherein the drive pulley includes a nub thereon which is configured to engage a belt which is driven by any suitable source.

16. The low profile transfer conveyor of claim 8 wherein the transfer conveyor is fixed to a support for same extending between end supports of the conveyor segments it is to bridge.

17. The low profile transfer conveyor of claim 8 wherein the belt of the belt assembly can move in either direction.

18. The low profile transfer conveyor of claim 8 wherein the transfer conveyor is fixed to a support for same extending between end supports of the conveyor segments it is to bridge by threaded rods or bolts which allow for adjustment of the height at which the transfer conveyor is positioned.

19. The low profile transfer conveyor of claim 8 wherein the drive pulley is engaged to a driven pulley by a drive shaft extending along a length of the mechanical belt carrying assembly.

20. A low profile transfer conveyor for bridging a gap between contiguous ends of conveyor belts of a multi segment conveyor system, the transfer conveyor comprising a belt assembly and a mechanical assembly received within the belt assembly for use in producing motion of the belt of the belt assembly, the belt assembly comprising a continuous belt having a low profile central section and outwardly flaring ends with the low profile central section extending substantially along an entire width of the conveyor belts it is to bridge, and the mechanical belt carrying assembly comprising at least a base portion for supporting the belt assembly and aligned cooperating pairs of tensioned end pulleys about which the transfer conveyor belt is guided, with at least one of the pulleys being a drive pulley for driving the belt assembly about the mechanical belt carrying assembly.

* * * * *